US008569967B2

(12) United States Patent
Chang et al.

(10) Patent No.: US 8,569,967 B2
(45) Date of Patent: Oct. 29, 2013

(54) LED BACKLIGHT MODULE AND BACKLIGHT DRIVING CIRCUIT

(75) Inventors: Shih-Hsien Chang, Taoyuan Hsien (TW); Po-Nien Ko, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 412 days.

(21) Appl. No.: 13/016,556

(22) Filed: Jan. 28, 2011

(65) Prior Publication Data

US 2011/0187269 A1    Aug. 4, 2011

(30) Foreign Application Priority Data

Feb. 2, 2010   (TW) .............................. 99103088 A

(51) Int. Cl.
*H01J 7/24* (2006.01)
(52) U.S. Cl.
USPC ........... 315/291; 315/113; 315/307; 315/308; 345/46; 345/52; 345/80; 345/102; 345/211
(58) Field of Classification Search
USPC ........ 315/113, 291, 307, 308; 345/46, 52, 80, 345/102, 211; 362/97.1, 97.2, 97.3, 612, 362/615, 630, 631
See application file for complete search history.

(56) References Cited

U.S. PATENT DOCUMENTS

| 7,220,040 | B2 * | 5/2007 | Lengyel et al. ............... 362/612 |
| 2006/0098165 | A1 * | 5/2006 | Lynch .............................. 352/85 |
| 2006/0163596 | A1 * | 7/2006 | Kim et al. ........................ 257/98 |
| 2007/0195551 | A1 * | 8/2007 | Shin .............................. 362/612 |

FOREIGN PATENT DOCUMENTS

| TW | 200643567 | 12/2006 |
| TW | 200929521 | 7/2009 |

* cited by examiner

*Primary Examiner* — Douglas W Owens
*Assistant Examiner* — Thai Pham
(74) *Attorney, Agent, or Firm* — Kirton McConkie; Evan R. Witt

(57) ABSTRACT

A LED backlight module includes a substrate, a heat-dissipating plate, a LED string and a backlight driving circuit. The LED string includes plural LEDs. The LED string further includes a positive driving terminal, a negative driving terminal and a connecting terminal. A positive output terminal, a negative output terminal and a zero voltage terminal of the backlight driving circuit are respectively connected with the positive driving terminal, the negative driving terminal and the heat-dissipating plate, so that a positive driving voltage and a negative driving voltage are generated by the backlight driving circuit to drive illumination of the LED string. A first number of LEDs of the LED string are electrically connected between the connecting terminal and the positive driving terminal. A second number of LEDs of the LED string are electrically connected between the connecting terminal and the negative driving terminal.

15 Claims, 4 Drawing Sheets

US 8,569,967 B2

LED BACKLIGHT MODULE AND BACKLIGHT DRIVING CIRCUIT

FIELD OF THE INVENTION

The present invention relates to a LED backlight module and a backlight driving circuit, and more particularly to a LED backlight module and a backlight driving circuit for use in a LCD panel.

BACKGROUND OF THE INVENTION

Nowadays, LCD televisions have experienced great growth and are now rapidly gaining in popularity. As known, backlight modules are crucial components of LCD panels. In general, cold cathode fluorescent lamps (CCFLs) and light emitting diodes (LEDs) have been widely used as light sources of the backlight modules. Since a cold cathode fluorescent lamp uses a mercury gas, it is prone to environmental pollution. With maturity of the LED technology, LED gradually replaces CCFL as the backlight source of the LCD television. In comparison with CCFL, LED has reduced volume and power consumption. That is, the use of LED is effective for facilitating miniaturization of the LCD panel, achieving better color saturation and meeting the environmentally-friendly requirement.

Generally, a LCD panel comprises plural LED strings. Each LED string comprises a plurality of LEDs connected in series. As the size of the LCD panel is gradually increased, the number of LEDs included in each LED string of the backlight module is increased. In this situation, a high driving voltage generated by the driving circuit is necessary to drive all LED strings. In the backlight driving circuit of a conventional backlight module, a single positive driving voltage is used to drive a LED string. As such, the voltage difference between the heat-dissipating plate and each LED string is equal to the positive driving voltage. In other words, as the driving voltage is increased, the voltage difference between the heat-dissipating plate and each LED string is increased. For providing sufficient insulating efficacy, the insulating distance between the heat-dissipating plate and each LED string and the thickness of the insulating medium should be increased. As such, the high driving voltage fails to be transmitted to the heat-dissipating plate in order to prevent from burning out the LED backlight module.

Although the increase of the insulating distance and the insulating medium can enhance the insulating efficacy, there are still some drawbacks. For example, the increases of the overall thickness, volume and weight of the backlight module are detrimental to miniaturization of the backlight module and the LCD panel. Moreover, since the backlight module and the LCD panel become thicker, the heat generated by each LED string fails to be quickly conducted to the heat-dissipating plate. For enhancing the heat-dissipating efficacy, the dimension of the heat-dissipating plate needs to be further increased. In this situation, the overall thickness, volume and weight of the backlight module are further increased.

For reducing the insulating distance between the heat-dissipating plate and each LED string, the number of LEDs included in each LED string may be reduced. For example, in a case that the number of LEDs included in each LED string is decreased from 100 to 50, the driving voltage for driving each LED string may be reduced. Since the number of LEDs included in each LED string is decreased, the number of LED string is increased. In addition, the numbers of driving circuits and backlight connecting lines are increased, and thus the fabricating cost is increased. Due to the backlight connecting lines, the overall lateral distance is increased. Under this circumstance, the backlight module is not applicable to a rimless LCD television.

Therefore, there is a need of providing a LED backlight module and a backlight driving circuit so as to obviate the drawbacks encountered from the prior art.

SUMMARY OF THE INVENTION

It is an object of the present invention to provide a LED backlight module and a backlight driving circuit for use in a LCD panel in order to reduce fabricating cost and volume.

In accordance with an aspect of the present invention, there is provided a LED backlight module. The LED backlight module includes a substrate, a heat-dissipating plate, a first LED string and a backlight driving circuit. The heat-dissipating plate is disposed on a first surface of the substrate for dissipating heat. The first LED string is disposed on a second surface of the substrate for emitting light. The first LED string includes plural LEDs electrically connected with each other in series. The first LED string further includes a first positive driving terminal, a first negative driving terminal and a first connecting terminal. The backlight driving circuit includes a first positive output terminal, a first negative output terminal and a zero voltage terminal. The first positive output terminal, the first negative output terminal and the zero voltage terminal are respectively connected with the first positive driving terminal, the first negative driving terminal and the heat-dissipating plate, so that a first positive driving voltage and a first negative driving voltage are generated by the backlight driving circuit to drive illumination of the first LED string. A first number of LEDs of the first LED string are electrically connected between the first connecting terminal and the first positive driving terminal. A second number of LEDs of the first LED string are electrically connected between the first connecting terminal and the first negative driving terminal.

In accordance with another aspect of the present invention, there is provided a backlight driving circuit of a LED backlight module. The LED backlight module includes a heat-dissipating plate and a first LED string. The backlight driving circuit generates a first positive driving voltage and a first negative driving voltage to drive illumination of the first LED string. The backlight driving circuit includes a first positive output terminal, a first negative output terminal and a zero voltage terminal. The first positive output terminal is electrically connected with a first positive driving terminal of the first LED string. The first negative output terminal is electrically connected with a first negative driving terminal of the first LED string. The zero voltage terminal is electrically connected with the heat-dissipating plate. The first positive driving voltage and the first negative driving voltage are respectively transmitted to the first positive driving terminal and the first negative output terminal of the first LED string. A voltage difference between the first positive driving terminal and the heat-dissipating plate is equal to the first positive driving voltage. A voltage difference between the first negative driving terminal and the heat-dissipating plate is equal to the first negative driving voltage.

In accordance with a further aspect of the present invention, there is provided a LED backlight module. The LED backlight module includes a substrate, a heat-dissipating plate, a first LED string and a backlight driving circuit. The heat-dissipating plate is disposed on a first surface of the substrate for dissipating heat. The first LED string is disposed on a second surface of the substrate for emitting light. The first LED string includes plural LEDs electrically connected with each other in series. The first LED string further includes a first positive driving terminal, a first negative driving terminal and a first connecting terminal. The first connecting terminal is electrically connected with the heat-dissipating plate. The backlight driving circuit includes a first positive output terminal and a first negative output terminal. The first positive output terminal and the first negative output terminal are respectively connected with the first positive driving terminal and the first negative driving terminal, so that a first positive driving voltage and a first negative driving voltage are generated by the backlight driving circuit to drive illumination of the first LED string. A first number of LEDs of the first LED string are electrically connected between the first connecting terminal and the first positive driving terminal. A second number of LEDs of the first LED string are electrically connected between the first connecting terminal and the first negative driving terminal.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides a LED backlight module. The LED backlight module comprises plural LED strings. For clarification and brevity, the plural LED strings comprising a first LED string and a second LED string are illustrated in the following embodiments.

Figure 1A:
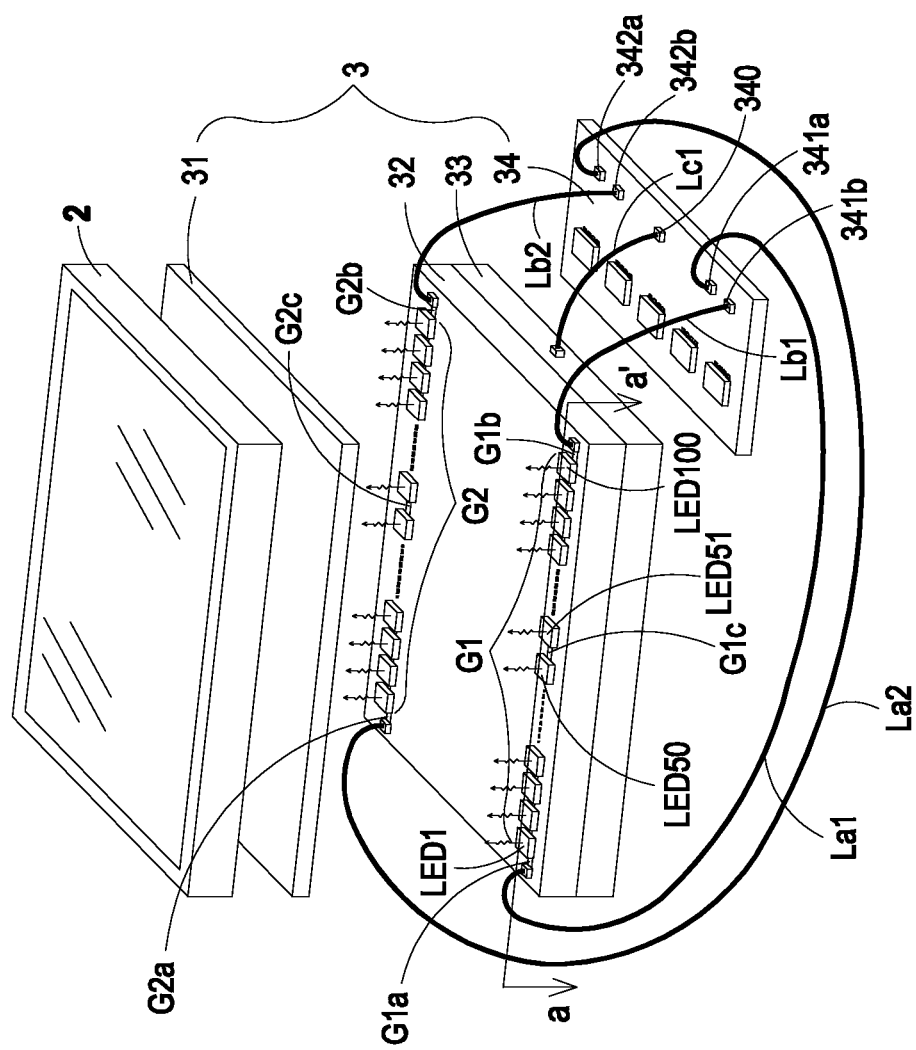
FIG. 1A is a schematic perspective view illustrating a LCD panel according to a first embodiment of the present invention.
Figure 1B:
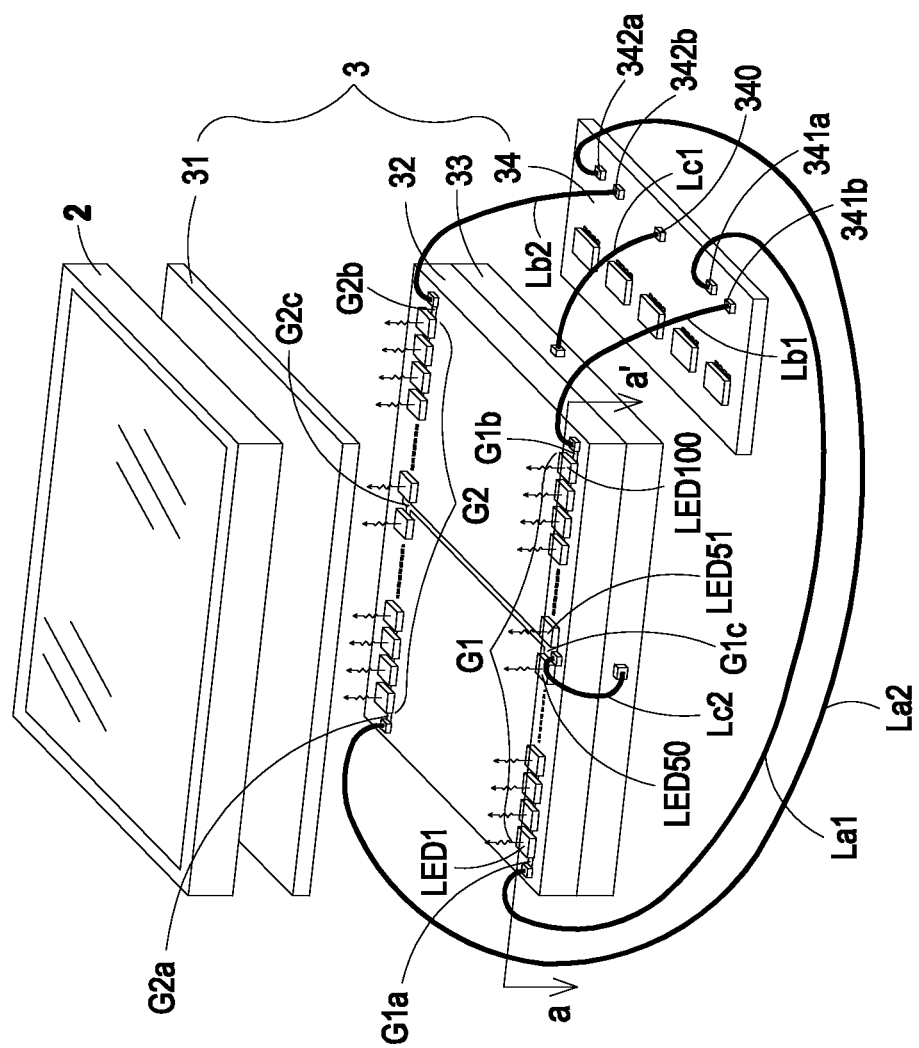
FIG. 1B is a schematic perspective view illustrating a LCD panel according to a second embodiment of the present invention.
Figure 1C:
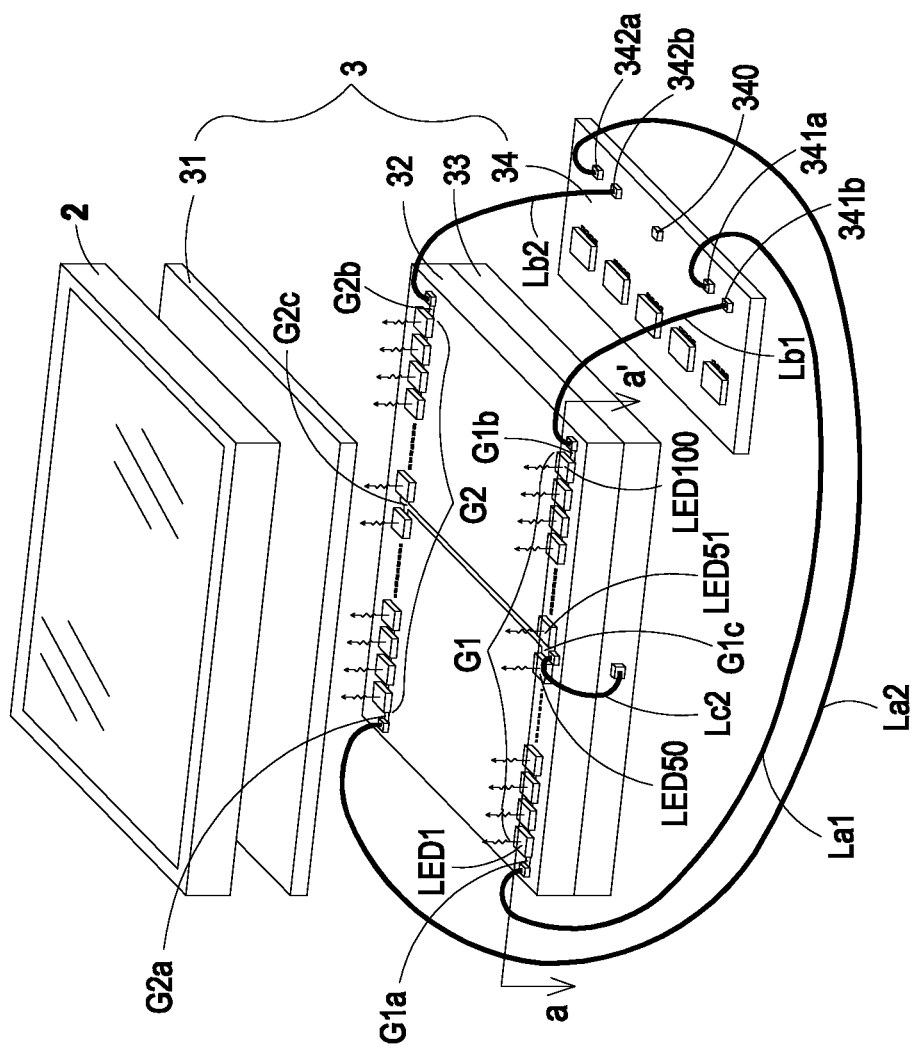
FIG. 1C is a schematic perspective view illustrating a LCD panel according to a third embodiment of the present invention.
Figure 2:
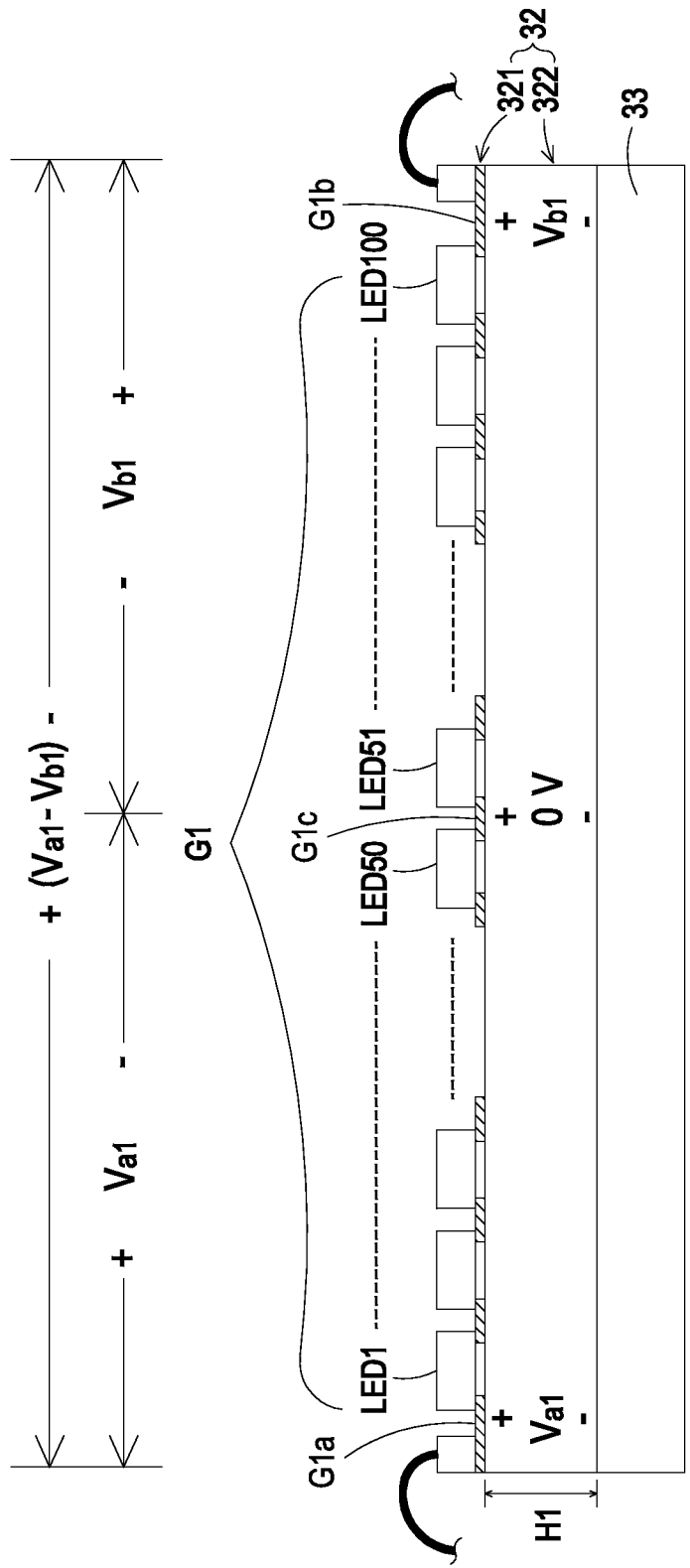
FIG. 2 is a schematic cross-sectional view illustrating the first LED string, the substrate and the heat-dissipating plate of the LED backlight module as shown in FIG. 1A, 1B or 1C and taken along the line aa'.

FIG. 1A is a schematic perspective view illustrating a LCD panel according to a first embodiment of the present invention. FIG. 1B is a schematic perspective view illustrating a LCD panel according to a second embodiment of the present invention. FIG. 1C is a schematic perspective view illustrating a LCD panel according to a third embodiment of the present invention. FIG. 2 is a schematic cross-sectional view illustrating the first LED string, the substrate and the heat-dissipating plate of the LED backlight module as shown in FIG. 1A, 1B or 1C and taken along the line aa'.

As shown in FIG. 1, the LCD panel comprises a panel module 2 and a LED backlight module 3. The LED backlight module 3 is arranged at the back of the imaging side of the panel module 2. The LED backlight module 3 illuminates the panel module 2. Before applying an electric field, the orientation of the liquid crystal molecules in the panel module 2 is changed. By controlling the voltage applied across the liquid crystal layer in each pixel, light can be allowed to pass through in varying amounts thus constituting different levels of gray.

From top to bottom, the LED backlight module 3 comprises a light-guiding plate 31, a first LED string G1, a second LED string G2, a substrate 32, a heat-dissipating plate 33, and a backlight driving circuit 34. In some embodiments, the light-guiding plate 31 is arranged at the lowermost layer (not shown).

The light-guiding plate 31 is used for guiding and diffusing the light that is emitted by the first LED string G1 and the second LED string G2, so that the light is uniformly directed to the panel module 2.

The substrate 32 comprises a single trace layer 321 and a single insulating layer 322 (see FIG. 2). In some embodiments, the substrate 32 comprises multiple trace layers and multiple insulating layers. The trace layer 321 is made of conductive material (e.g. copper). The trace layer 321 is disposed on the top surface of the insulating layer 322. The trace pattern of the trace layer 321 is dependent on the arrangement of the LEDs. For example, trace pattern of the trace layer 321 is selected such that the first LED string G1 and the second LED string G2 are linearly arranged on the substrate 32. The insulating layer 322 is made of insulating material. By the insulating layer 322, the voltage for driving the LEDs fails to be transmitted to the heat-dissipating plate 33 in order to prevent from burning out the LED backlight module 3.

In some embodiments, an insulating medium (not shown) is arranged between the substrate 32 and the heat-dissipating plate 33. An example of the insulating medium includes but is not limited to an insulating plate or an insulating adhesive. The insulating medium could enhance the insulating and thermally-conductive efficacy between the LEDs and the heat-dissipating plate 33. Preferably, the insulating medium is made of a material with high thermal conductivity in order to enhance the heat-dissipating efficacy of the LED backlight module 3.

In this embodiment, the first LED string G1 and the second LED string G2 are disposed on the top surface of the substrate 32. The first LED string G1 comprises 100 LEDs, which are electrically connected with each other in series through the trace layer 321 of the substrate 32. Similarly, the second LED string G2 also comprises 100 LEDs, which are electrically connected with each other in series through the trace layer 321 of the substrate 32. Fifty of the 100 LEDs of the first LED string G1 are electrically connected between the positive driving terminal G1a and a connecting terminal G1c of the first LED string G1 in series. The other fifty of the 100 LEDs of the first LED string G1 are electrically connected between the connecting terminal G1c and the negative driving terminal G1b of the first LED string G1 in series. Similarly, fifty of the 100 LEDs of the second LED string G2 are electrically connected between the positive driving terminal G2a and a connecting terminal G2c of the second LED string G2 in series. The other fifty of the 100 LEDs of the second LED string G2 are electrically connected between the connecting terminal G2c and the negative driving terminal G2b of the second LED string G2 in series.

In other words, 100 LEDs are electrically connected between the positive driving terminal G1a and the negative driving terminal G1b of the first LED string G1 in series; and 100 LEDs are electrically connected between the positive driving terminal G2a and the negative driving terminal G2b of the second LED string G2 in series. Preferably, the connecting terminal G1c is arranged at the middle of the 100 LEDs of the first LED string G1, and the connecting terminal G2c is arranged at the middle of the 100 LEDs of the second LED string G2. For example, the connecting terminal G1c is arranged between the 50$^{th}$ LED and the 51$^{st}$ LED of the first LED string G1. Alternatively, the locations of the connecting terminals G1c and G2c are not restricted.

The heat-dissipating plate 33 is disposed on the bottom surface of the substrate 32. The heat-dissipating plate 33 is made of metallic material (e.g. aluminum) for dissipating the heat that is generated by the first LED string G1 and the second LED string G2. In this embodiment, the backlight driving circuit 34 is arranged at the lowermost layer of the LED backlight module 3, and fixed on a surface of the heat-dissipating plate 33 (not shown). The backlight driving circuit 34 is used for driving illumination of the first LED string G1 and the second LED string G2. The heat generated by the backlight driving circuit 34 could be also dissipated by the heat-dissipating plate 33.

In this embodiment, the backlight driving circuit 34 comprises a first positive output terminal 341a, a second positive output terminal 342a, a first negative output terminal 341b, a second negative output terminal 432b and a zero voltage terminal 340. As a consequence, the backlight driving circuit 34 generates a first positive driving voltage Va1, a first negative driving voltage Vb1, a second positive driving voltage Va2 and a second negative driving voltage Vb2 to driving illumination of the first LED string G1 and the second LED string G2, respectively.

The first positive output terminal 341a and the first negative output terminal 341b of the backlight driving circuit 34 are electrically connected with the positive driving terminal G1a and the negative driving terminal G1b of the first LED string G1 through a first positive connecting line La1 and a first negative connecting line Lb1, respectively. The second positive output terminal 342a and the second negative output terminal 342b of the backlight driving circuit 34 are electrically connected with the positive driving terminal G2a and the negative driving terminal G2b of the second LED string G2 through a second positive connecting line La2 and a second negative connecting line Lb2, respectively. The first positive driving voltage Va1 and the first negative driving voltage Vb1 generated by the backlight driving circuit 34 are respectively transmitted to the positive driving terminal G1a and the negative driving terminal G1b of the first LED string G1. The second positive driving voltage Va2 and the second negative driving voltage Vb2 generated by the backlight driving circuit 34 are respectively transmitted to the positive driving terminal G2a and the negative driving terminal G2b of the second LED string G2.

The zero voltage terminal 340 of the backlight driving circuit 34 is electrically connected to the heat-dissipating plate 33 through a first zero voltage connecting line Lc1. As such, the potential at the zero voltage terminal 340 is zero. The voltage difference between the positive driving terminal G1a and the negative driving terminal G1b of the first LED string G1 is equal to the first negative driving voltage Vb1 subtracted from the first positive driving voltage Va1 (i.e. Va1-Vb1). Similarly, the voltage difference between the positive driving terminal G2a and the negative driving terminal G2b of the second LED string G2 is equal to the second negative driving voltage Vb2 subtracted from the second positive driving voltage Va2 (i.e. Va2-Vb2).

In this embodiment, the number of LEDs serially-connected between the positive driving terminal G1a and the connecting terminal G1c of the first LED string G1 is equal to the number of LEDs serially-connected between the connecting terminal G1c and the positive driving terminal G1a and of the first LED string G1. The absolute value of the first positive driving voltage Va1 is equal to the absolute value of first negative driving voltage Vb1. As such, the potential at the connecting terminal G1c of the first LED string G1 is zero. Similarly, the number of LEDs serially-connected between the positive driving terminal G2a and the connecting terminal G2c of the second LED string G2 is equal to the number of LEDs serially-connected between the connecting terminal G2c and the positive driving terminal G2a and of the second LED string G2. The absolute value of the second positive driving voltage Va2 is equal to the absolute value of second negative driving voltage Vb2. As such, the potential at the connecting terminal G2c of the second LED string G2 is zero.

The voltage difference between the positive driving terminal G1a and the negative driving terminal G1b of the first LED string G1 (i.e. Va1-Vb1) and the voltage difference between the positive driving terminal G2a and the negative driving terminal G2b of the second LED string G2 (i.e. Va2-Vb2) are relatively higher. However, the voltage between the positive driving terminal G1a and the heat-dissipating plate 33 (i.e. Va1), the voltage between the negative driving terminal G1b and the heat-dissipating plate 33 (i.e. Vb1), the voltage between the positive driving terminal G2a and the heat-dissipating plate 33 (i.e. Va2) and the voltage between the negative driving terminal G2b and the heat-dissipating plate 33 (i.e. Vb2) are relatively lower. As such, the first thickness H1 of the insulating layer 322 (see FIG. 2) is designed according to the relatively lower voltage Va1, Vb1, Va2 or Vb2, rather than the relatively higher voltage (Va1-Vb1) or (Va2-Vb2). In other words, the first thickness H1 is very thin.

Please refer to FIGS. 1A and 2 again. The first LED to the 100$^{th}$ LED of the first LED string G1 are arranged on the substrate 32 from left to right. Through the trace layer 321 of the substrate, these 100 LEDs are electrically connected with each other in series. The positive driving terminal G1a of the first LED string G1 is arranged at the left side of the first LED. The connecting terminal G1c is arranged between the 50$^{th}$ LED and the 51$^{st}$ LED. The negative driving terminal G1b of the first LED string G1 is arranged at the right side of the 100$^{th}$ LED. The voltages at the positive driving terminal G1a, the connecting terminal G1c and the negative driving terminal G1b are equal to the first positive driving voltage Va1, zero and the first negative driving voltage Vb1, respectively.

The voltage between the connecting terminal G1c and the heat-dissipating plate 33 is zero. The voltage between the first LED and the heat-dissipating plate 33 is equal to the first positive driving voltage Va1. In other words, the first positive driving voltage Va1 between the first LED and the heat-dissipating plate 33 is gradually decreased to the zero voltage between the 50$^{th}$ LED and the heat-dissipating plate 33. Similarly, the voltage between the 100$^{th}$ LED and the heat-dissipating plate 33 is equal to the first negative driving voltage Vb1. In other words, the zero voltage between the 51$^{st}$ LED and the heat-dissipating plate 33 is gradually decreased to the first negative driving voltage Vb1 between the 100$^{th}$ LED and the heat-dissipating plate 33.

In this embodiment, the first positive driving voltage Va1 is +150 volts and the first negative driving voltage Vb1 is −150 volts, so that the voltage difference between the positive driving terminal G1a and the negative driving terminal G1b is 300 volts. The first thickness H1 of the insulating layer 322 is designed according to the relatively lower voltage Va1 or Vb1. As a consequence, the first thickness H1 is very thin. In a case that each LED string of the conventional backlight module comprises 100 LEDs, the driving voltage is 300 volts and thus the corresponding first thickness is 20 mm. Whereas, according to the present invention, the first thickness H1 of the insulating layer 322 is 5~10 mm because the Va1 or Vb1 is only 150 volts.

Please refer to FIGS. 1B and 2. In comparison with FIG. 1A, the zero voltage terminal 340 of the backlight driving circuit 34, the heat-dissipating plate 33, the connecting terminal G1c of the first LED string G1 and the connecting terminal G2c of the second LED string G2 of the backlight driving circuit 34 as shown in FIG. 1B are electrically connected with each other. As such, the potentials at the zero voltage terminal 340, the heat-dissipating plate 33, the connecting terminal G1c and the connecting terminal G2c are zero. In this embodiment, the zero voltage terminal 340 of the backlight driving circuit 34 is electrically connected to the heat-dissipating plate 33 through a first zero voltage connecting line Lc1. The connecting terminal G1c of the first LED string G1 and the connecting terminal G2c of the second LED string G2 are electrically connected to the heat-dissipating plate 33 through a second zero voltage connecting line Lc2. As such, the zero voltage terminal 340 of the backlight driving circuit 34, the heat-dissipating plate 33, the connecting terminal G1c of the first LED string G1 and the connecting terminal G2c of the second LED string G2 of the backlight driving circuit 34 are electrically connected with each other, and the potentials thereof are zero. In other words, the first thickness H1 of the insulating layer 322 (see FIG. 2) is relatively thinner.

Please refer to FIGS. 1C and 2. In this embodiment, the heat-dissipating plate 33, the connecting terminal G1c of the first LED string G1 and the connecting terminal G2c of the second LED string G2 are electrically connected with each other, and the potentials thereof are zero. The connecting terminal G1c of the first LED string G1 and the connecting terminal G2c of the second LED string G2 are electrically connected to the heat-dissipating plate 33 through a second zero voltage connecting line Lc2. In other words, the first thickness H1 of the insulating layer 322 (see FIG. 2) is relatively thinner.

From the above description, the LED backlight module of the present invention is advantageous for miniaturization of the LCD panel because the overall thickness, volume and weight of the backlight module are reduced. Moreover, the LED backlight module is applied to a large-sized LCD panel without the need of reducing the number of LEDs included in each LED string. As such, the numbers of driving circuits and backlight connecting lines (e.g. the first positive connecting line La1, the first negative connecting line Lb1, the second positive connecting line La2 and the second negative connecting line Lb2) will not be increased. The LED backlight module of the present invention is more cost-effective, and has reduced overall lateral distance. Under this circumstance, the backlight module is applicable to a rimless LCD television While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A LED backlight module, comprising:
    a substrate;
    a heat-dissipating plate disposed on a first surface of said substrate for dissipating heat;
    a first LED string disposed on a second surface of said substrate for emitting light, wherein said first LED string comprises plural LEDs electrically connected with each other in series, and first LED string further comprises a first positive driving terminal, a first negative driving terminal and a first connecting terminal, and said first connecting terminal is arranged between said first positive driving terminal and said first negative driving terminal of said first LED string; and
    a backlight driving circuit comprising a first positive output terminal, a first negative output terminal and a zero voltage terminal, wherein said first positive output terminal, said first negative output terminal and said zero voltage terminal are respectively connected with said first positive driving terminal, said first negative driving terminal and said heat-dissipating plate, so that a first positive driving voltage and a first negative driving voltage are generated by said backlight driving circuit to drive illumination of said first LED string,
    wherein a first number of LEDs of said first LED string are electrically connected between said first connecting terminal and said first positive driving terminal, and a second number of LEDs of said first LED string are electrically connected between said first connecting terminal and said first negative driving terminal.

2. The LED backlight module according to claim 1 further comprising a light-guiding plate for guiding and diffusing said light.

3. The LED backlight module according to claim 1 wherein said substrate comprises:
    a single or multi-layered insulating layer; and
    a single or multi-layered trace layer disposed on said insulating layer.

4. The LED backlight module according to claim 1 further comprising an insulating medium between said substrate and said heat-dissipating plate.

5. The LED backlight module according to claim 1 wherein said plural LEDs of said first LED string are linearly arranged on said substrate.

6. The LED backlight module according to claim 1 wherein said plural LEDs of said first LED string are electrically connected between said first positive driving terminal and said first negative driving terminal in series.

7. The LED backlight module according to claim 6 wherein said first number of LEDs of said first LED string is equal to said second number of LEDs of said first LED string.

8. The LED backlight module according to claim 1 further comprising a second LED string disposed on said second surface of said substrate, wherein said backlight driving circuit further comprises a second positive output terminal and a second negative output terminal, and said second LED string further comprises a second positive driving terminal, a second negative driving terminal and a second connecting terminal, wherein said second positive output terminal and said second negative output terminal of said second LED string are respectively connected with said second positive driving terminal and said second negative driving terminal of said backlight driving circuit, so that a second positive driving voltage and a second negative driving voltage are generated by said backlight driving circuit to drive illumination of said second LED string.

9. The LED backlight module according to claim 8 wherein said first connecting terminal of said first LED string and/or said second connecting terminal of said second LED string are electrically connected to said heat-dissipating plate.

10. A backlight driving circuit of a LED backlight module, said LED backlight module comprising a heat-dissipating plate and a first LED string, said backlight driving circuit generating a first positive driving voltage and a first negative driving voltage to drive illumination of said first LED string, said backlight driving circuit comprising:

a first positive output terminal electrically connected with a first positive driving terminal of said first LED string;

a first negative output terminal electrically connected with a first negative driving terminal of said first LED string; and a zero voltage terminal electrically connected with said heat-dissipating plate, wherein said first positive driving voltage and said first negative driving voltage are respectively transmitted to said first positive driving terminal and said first negative output terminal of said first LED string, wherein a voltage difference between said first positive driving terminal and said heat-dissipating plate is equal to said first positive driving voltage, and a voltage difference between said first negative driving terminal and said heat-dissipating plate is equal to said first negative driving voltage;

wherein said first LED string comprises plural LEDs, which are serially-connected between said first positive driving terminal and said first negative driving terminal, a first connecting terminal is arranged between said first positive driving terminal and said first negative driving terminal of said first LED string, a first number of LEDs of said first LED string are electrically connected between said first connecting terminal and said first positive driving terminal, and a second number of LEDs of said first LED string are electrically connected between said first connecting terminal and said first negative driving terminal.

11. The backlight driving circuit according to claim 10 wherein said first number of LEDs of said first LED string is equal to said second number of LEDs of said first LED string.

12. The backlight driving circuit according to claim 10 wherein said LED backlight module further comprises a second LED string disposed on said second surface of said substrate, wherein said backlight driving circuit further comprises a second positive output terminal and a second negative output terminal, and said second LED string further comprises a second positive driving terminal and a second negative driving terminal, wherein said second positive output terminal and said second negative output terminal of said second LED string are respectively connected with said second positive driving terminal and said second negative driving terminal of said backlight driving circuit, so that a second positive driving voltage and a second negative driving voltage are generated by said backlight driving circuit to drive illumination of said second LED string.

13. The backlight driving circuit according to claim 12 wherein said first connecting terminal of said first LED string and/or said second connecting terminal of said second LED string are electrically connected to said heat-dissipating plate.

14. A LED backlight module, comprising:

a substrate;

a heat-dissipating plate disposed on a first surface of said substrate for dissipating heat;

a first LED string disposed on a second surface of said substrate for emitting light, wherein said first LED string comprises plural LEDs electrically connected with each other in series, and said first LED string further comprises a first positive driving terminal, a first negative driving terminal and a first connecting terminal, said connecting terminal is arranged between said first positive driving terminal and said first negative driving terminal of said first LED string, and said first connecting terminal is electrically connected with said heat-dissipating plate; and a backlight driving circuit comprising a first positive output terminal and a first negative output terminal, wherein said first positive output terminal and said first negative output terminal are respectively connected with said first positive driving terminal and said first negative driving terminal, so that a first positive driving voltage and a first negative driving voltage are generated by said backlight driving circuit to drive illumination of said first LED string, wherein a first number of LEDs of said first LED string are electrically connected between said first connecting terminal and said first positive driving terminal, and a second number of LEDs of said first LED string are electrically connected between said first connecting terminal and said first negative driving terminal.

15. The LED backlight module according to claim 14 wherein said first number of LEDs of said first LED string is equal to said second number of LEDs of said first LED string.

* * * * *